United States Patent
Islam et al.

(10) Patent No.: US 10,157,240 B2
(45) Date of Patent: Dec. 18, 2018

(54) SYSTEMS AND METHODS TO GENERATE A CONCEPT GRAPH

(71) Applicant: eBay Inc., San Jose, CA (US)

(72) Inventors: Atiq Islam, San Jose, CA (US); Shifa Fazal Mahamood, San Jose, CA (US); Ganesh Gopalakrishnan, San Jose, CA (US); Ganesh Talele, Milpitas, CA (US)

(73) Assignee: eBay Inc., San Jose, CA (US)

( * ) Notice: Subject to any disclaimer, the term of this patent is extended or adjusted under 35 U.S.C. 154(b) by 530 days.

(21) Appl. No.: 14/873,099

(22) Filed: Oct. 1, 2015

(65) Prior Publication Data

US 2017/0098011 A1  Apr. 6, 2017

(51) Int. Cl.
*G06F 17/30* (2006.01)
*H04L 29/08* (2006.01)

(52) U.S. Cl.
CPC .. *G06F 17/30958* (2013.01); *G06F 17/30961* (2013.01); *G06F 17/30991* (2013.01); *H04L 67/02* (2013.01)

(58) Field of Classification Search
None
See application file for complete search history.

(56) References Cited

U.S. PATENT DOCUMENTS

2014/0040285 A1* 2/2014 Rubinstein .......... G06F 17/3053
                                                          707/751
2015/0294029 A1* 10/2015 Sanghai ............ G06F 17/30973
                                                          707/732

FOREIGN PATENT DOCUMENTS

AU  2008261113 A1  1/2009
WO  WO-9917227 A1  4/1999

OTHER PUBLICATIONS

"International Application Serial No. PCT/US2016/054216, International Search Report dated Dec. 27, 2016", 2 pgs.
"International Application Serial No. PCT/US2016/054216, Written Opinion dated Dec. 27, 2016", 6 pgs.

* cited by examiner

*Primary Examiner* — Anh Tai Tran
(74) *Attorney, Agent, or Firm* — Schwegman Lundberg & Woessner, P.A.

(57) ABSTRACT

In various example embodiments, a system and method for generating a concept graph are presented. Trending queries are determined from a query log stored in a database. Item pages that correspond to the trending queries are identified. Aspects from the item pages are also identified. The aspects from the item page may be stored as pre-defined data within the database. Query nodes for each of the trending queries are generated, and the query nodes are included in a graph. Leaf nodes for each of the aspects are generated. Connections between the leaf nodes and the query nodes are generated. A destination page that includes various aspects is generated.

20 Claims, 10 Drawing Sheets

SYSTEMS AND METHODS TO GENERATE A CONCEPT GRAPH

TECHNICAL FIELD

Embodiments of the present disclosure relate generally to data processing and, more particularly, but not by way of limitation, to systems and methods to generate a concept graph.

BACKGROUND

Conventionally, an item page of an item listing includes data that describes an item from the item listing. Moreover, the data that describes the item is stored in a database.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Systems and methods to generate a concept graph are described herein. The concept graph is generated using information from a query log, and the concept graph is used by the system to generate a destination page. In various embodiments, users of a network publication system will query the network publication system in order to search items published as item listings on the network publication system. The queries received by the network publication are tracked and stored in a query log. Popular or trending queries are identified from the query log. Moreover, information from the published item listings is organized and stored in a database maintained by the network publication system. In order to display a destination page that includes information from item listings that correspond to the popular queries by the users of the network publication system, a concept graph is generated by the network publication system. The concept graph is generated using the information from the query log and the information from the published item listings. From the concept graph, the network publication system is able to generate the destination page and display it on a client device. The destination page may also correspond to one of the trending queries.

Accordingly, one or more of the methodologies discussed herein may obviate a need for generating a destination page for each query in the query log, which may have the technical effect of reducing computing resources used by one or more devices within the system. Also, the destination page may display information relevant to a trending query, which may obviate a need for users of the network publication system to browse through item listings that are less relevant to the trending query. Moreover, the identification of trending queries may also reduce the occurrence of misspelled queries because the misspelled queries will have a lower chance of being a trending query. Examples of such computing resources include, without limitation, processor cycles, network traffic, memory usage, storage space, and power consumption.

Figure 1:
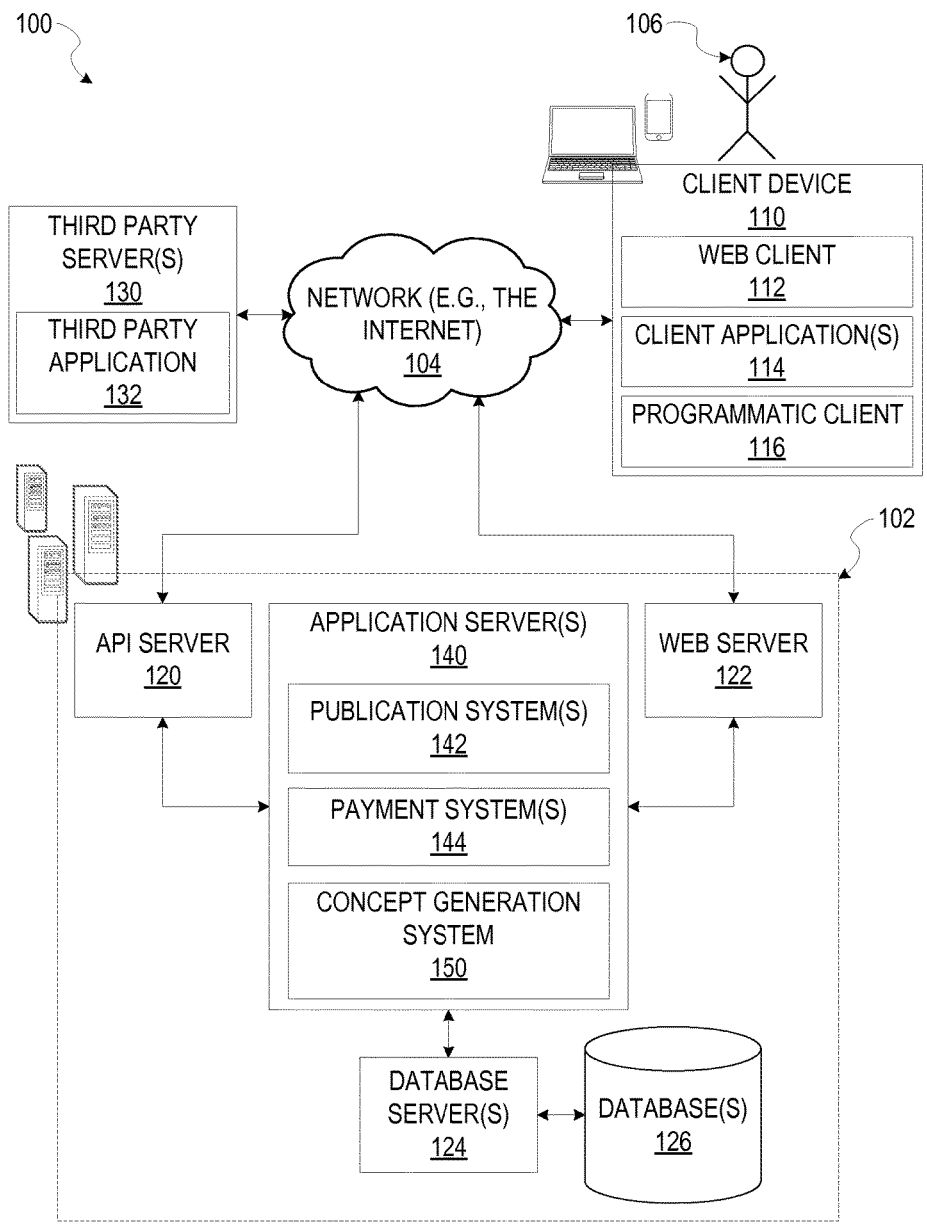
FIG. 1 is a block diagram illustrating a networked system, according to some example embodiments.

With reference to FIG. 1, an example embodiment of a high-level client-server-based network architecture 100 is shown. A networked system 102, in the example forms of a network-based publication or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), a client application 114, and a programmatic client 116 executing on client device 110.

The client device 110 may comprise, but is not limited to, a mobile phone, desktop computer, laptop, portable digital assistants (PDAs), smart phones, tablets, ultra-books, netbooks, laptops, multi-processor systems, microprocessor-based or programmable consumer electronics, game consoles, set-top boxes, or any other communication device that a user may utilize to access the networked system 102. In some embodiments, the client device 110 comprises a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based publication system that responds to requests for product listings, publishes publications comprising item listings of products available on the network-based publication system, and manages payments for these marketplace transactions. For example, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but interacts with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 hosts one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, publication, or payment functions that are supported by the relevant applications of the networked system 102.

The publication systems 142 provide a number of publication functions and services to users 106 that access the networked system 102. The payment systems 144 likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The concept generation system 150 provides functionality operable to perform generate a concept graph. In doing so, the concept generation system 150 may access specific data from the databases 126, the third party servers 130, the publication system 142, and other sources. In particular, the concept generation system 150 may access, from the databases 126, a query log and information regarding item listings published by the publication system 142. In some example embodiments, the concept generation system 150 may analyze the user data to perform personalization of user preferences. In some example embodiments, the concept generation system 150 communicates with the publication systems 142 (e.g., accessing item listings) and payment system 144. In an alternative embodiment, the concept generation system 150 may be a part of the publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and concept generation system 150 could also be implemented as standalone software programs, which do not necessarily have networking capabilities.

The web client 112 accesses the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Figure 2:
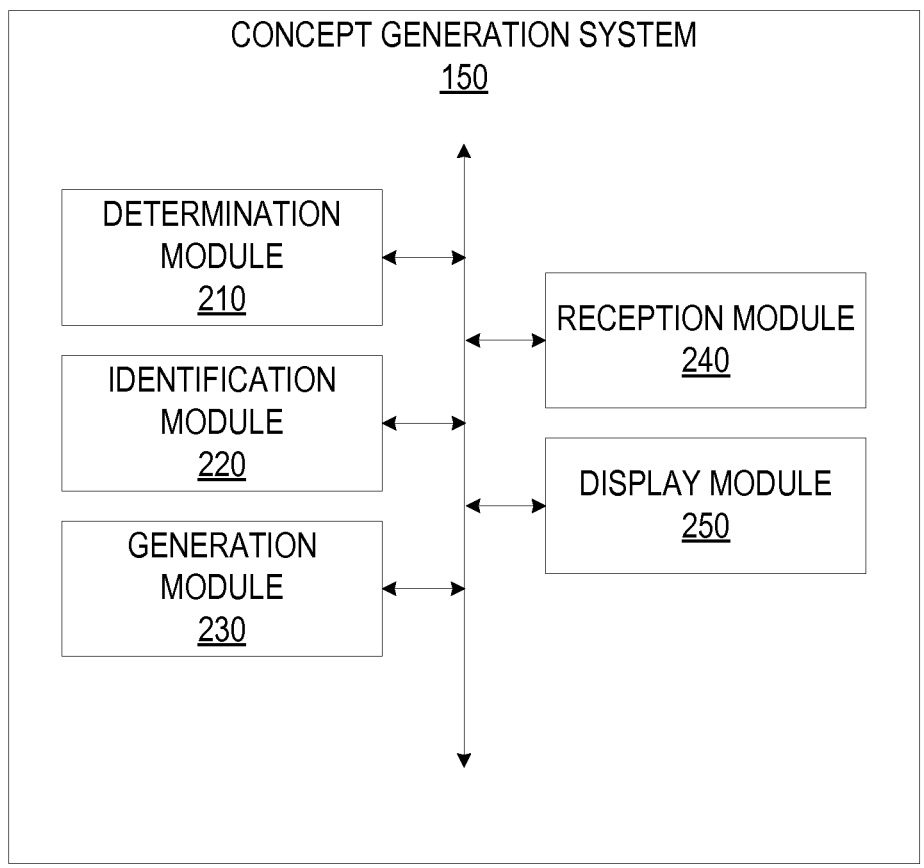
FIG. 2 is a block diagram illustrating components of a concept generation system, according to some example embodiments.

FIG. 2 is a block diagram illustrating components of the concept generation system 150, according to some example embodiments. The concept generation system 150 is shown as including a determination module 210, an identification module 220, a generation module 230, a reception module 240, and a display module 250, all configured to communicate with each other (e.g., via a bus, shared memory, or a switch). Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In various embodiments, the determination module 210 is configured to determine trending queries. Further, the determination module 210 determines the trending queries from a query log stored in a database. The trending queries are queries that are each indicated by the query log as being received at least a threshold number of instances. Moreover, the trending queries are received at a network publication system (e.g., publication system 142), and are performed by users of the network publication system. An example trending query is one that is received at the network publication system a number of times that is greater than the threshold number. In this manner, misspelled queries have a lower chance of being determined by the determination module 210 as a trending query. In further embodiments, the trending queries are queries that are determined by the determination module 210 as being received within a predetermined window of time.

In various embodiments, the identification module 220 is configured to identify item pages that correspond to the trending queries. An item page includes a description of an item and an images of the item. The description of the item may provide information about the item including a price of the item. The item page also includes an option to purchase the item. In further embodiments, the item page displays one or more item listings for the one or more items. In further embodiments, the identification module 220 is to identify item pages that are selected by the users of the publication system from results generated by the trending queries. Accordingly, these item pages are identified by the identification module 220 as corresponding to the trending queries. For example, a trending query for "Mother's Day gift" may produce a search results page that includes item pages for smart phones and item pages for shoes, each of which are selected by users of the publication system. As a result, the item pages for the smart phones and the item pages for the shoes are identified as corresponding to the trending query for "Mother's Day gift." As another example, a trending query for "iPhone smart phones" may produce a search results page that includes item pages for a first version of an iPhone® and a second version of an iPhone®, each of are selected by the users of the publication system. Accordingly, the item pages for both versions of the iPhone® are identified as corresponding to the trending query for "iPhone smart phones." Also, a trending query may include keywords that identify the item pages.

In various embodiments, the identification module 220 is further configured to identify aspects from the item pages that correspond to the trending queries. The aspects may be stored as data within the database. For example, during creation of the item pages, each of the aspects from the item pages may identified by the identification module 220 and organized as information within the database. The aspects identify features of the items from the item pages. As an example, an item page for a smart phone may include aspects regarding a model of the smart phone, storage capabilities of the smart phone, a size of the smart phone, and the like. Therefore, the identification module 220 is further to identify the features of the items from the item pages.

In various embodiments, the identification module 220 is further configured to identify categories of items that correspond to the items from the item pages. For example, the items from an item page may belong to a specific category. The item page for the smart phone may include items that belong to an electronics category. The item page for the smart phone may also include items that belong to a portable devices category. Accordingly, the categories of items are also aspects identified by the identification module 220.

In various embodiments, the identification module 220 is further configured to identify queries from the trending queries that are received in succession for a threshold number of instances. In particular, the identification module 220 identifies a first query and a second query from among the trending queries. Also, the first query and the second query are indicated as being received in succession at least a threshold number of instances.

In various embodiments, the generation module 230 is configured to generate query nodes for each of the trending queries. The query nodes are also included in a graph. In other words, the generation module 230 generates a separate node in the graph for each of the trending queries. Therefore, each of the trending queries is represented as a node from the graph, and information for each trending query is stored in a node from the graph. The generation module 230 is further to generate leaf nodes for each of the aspects from the item pages. Moreover, the generation module 230 generates connections between the leaf nodes and the query nodes for each of the trending queries. In order to accomplish this, the generation module 230 is to generate a connection between a specific leaf node and a specific query node. The specific leaf node represents an aspect of an item page, and the item page corresponds to a specific query represented by the specific query node. The generation module 230 may repeat this process for each of the query nodes of the graph until all possible connections have been generated. In further embodiments, the generation module 230 is to generate a connection between the query nodes for each of the trending queries. The connections between the query nodes are generated based on queries identified as being received in succession, such as the first query and the second query. The graph may be used by the display module 250 to assist with the display of a destination page, as further explained below. Moreover, once generated, the graph may be stored as a data structure within a database of the network publication system. In further embodiments, each of the leaf nodes may also be connected to each other, and the connections are generated by the generation module 230. For example, a category leaf node that represents a category of items may also have other leaf nodes connected to the category leaf node. The leaf nodes connected to the category leaf node may represent features of items that fall within the category represented by the category leaf node.

In further embodiments, the generation module 230 generates nodes for each of the item pages that correspond to the trending queries. In other words, a separate node for each item page is generated by the generation module 230. For example, a node for an iPhone® 6 is generated by the generation module 230 because an iPhone® 6 item page is identified as corresponding to a trending query. Also, a node for an item page may include information about an item from the item page.

In further embodiments, the generation module 230 is to generate a destination page that includes various aspects. The generation of the destination page is based on the generated graph. The destination page corresponds to a specific query node from the generated graph, and the generation module 230 uses the specific query node to generate the destination page. The various aspects correspond to leaf nodes that are connected to the specific query node from the generated graph, and the generation module 230 uses the leaf nodes connected to the specific query node to generate the destination page.

In various embodiments, the reception module 240 is configured to receive, from a client device, a query that matches one of the query nodes from the generated graph. Moreover, the identification module 220 is further to, using the generated graph, identify a specific query node that matches the query received from the client device. In other words, the specific query node that matches the query received from the client device is identified, by the identification module 220, from the generated graph. Also, the specific query node represents a trending query that matches the query from the client device. For example, the query from the client device may match one of the trending queries represented by the query nodes from the generated graph. Further, a match may comprise an overlap of a threshold number of characters between the received query and the trending query. For example, the query from the client device may have been misspelled by a user operating the client device. However, if user may only misspelled a few characters, the query will still be matched with the specific query node because of the threshold number of overlapping characters between the query and the trending query represented by the specific query node. In further embodiments, the reception module 240 is configured to receive each of the trending queries from one or more client devices.

In various embodiments, the display module 250 is configured to cause display of a destination page that includes various aspects. The destination page is displayed on a client device within a user interface. The destination page corresponds to a specific query node from the generated graph. Also, the various aspects correspond to leaf nodes that are connected to the specific query node from the generated graph. The destination page may include information about the trending query included in the specific query node. For instance, the destination page may be titled using the trending query or may simply depict the trending query included in the specific query node. Further, the destination page may include links that are selectable to display item pages that correspond to the trending query included in/represented by the specific query node. For instance, thumbnail information regarding the item pages may be displayed as part of the destination page, and the thumbnails may also serve as links to their respective item pages. Also, the thumbnails or links may correspond to the aspects that are identified by the identification module 220. For example, the thumbnails may be the categories that are identified by the identification module 220.

Figure 3:
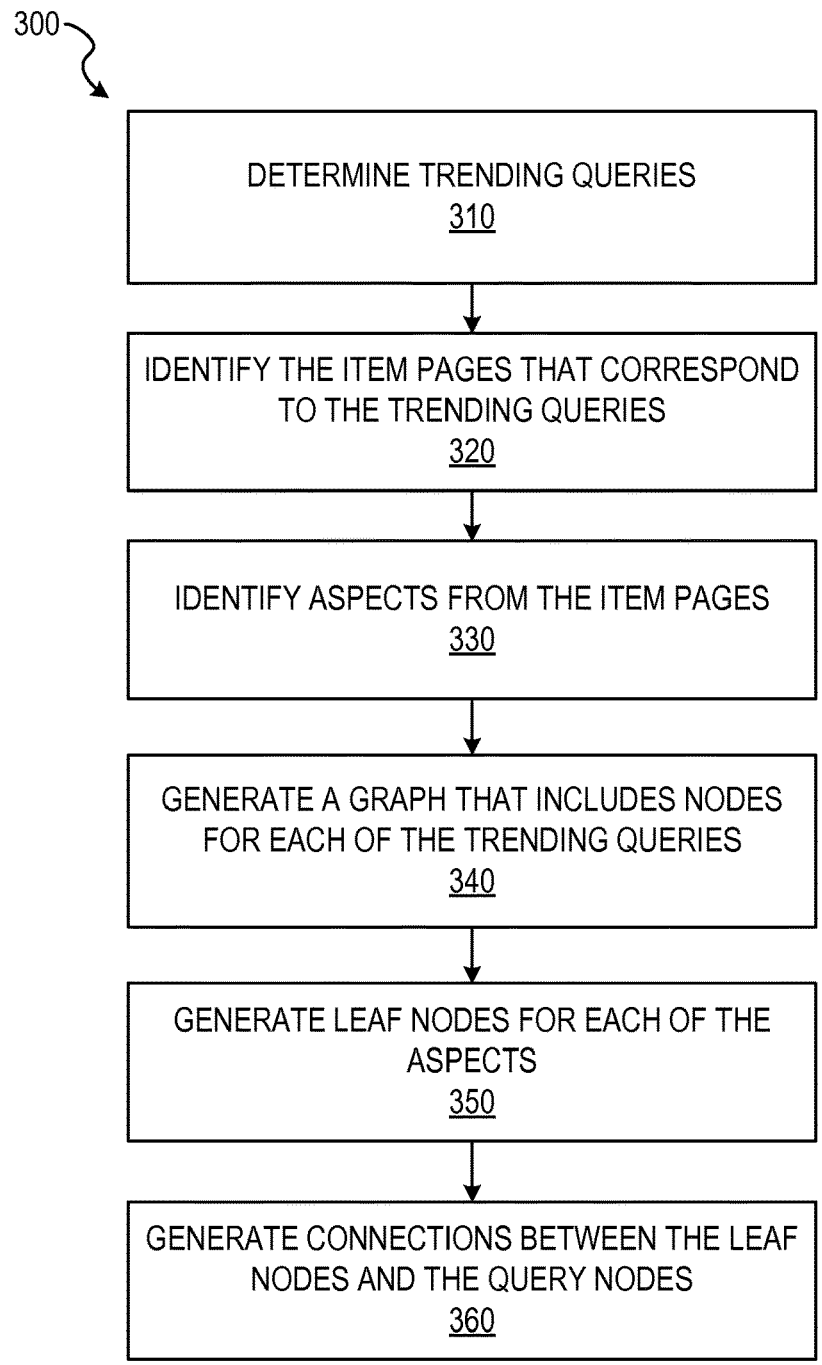
FIGS. 3-6 are flowcharts illustrating operations of the concept generation system, according to some example embodiments.

FIG. 3-6 are flowcharts illustrating operations of the concept generation system 150 in performing a method 300 of generating a graph, according to some example embodiments. Operations in the method 300 may be performed by the concept generation system 150, using modules described above with respect to FIG. 2. As shown in FIG. 3, the method 300 includes operations 310, 320, 330, 340, 350, and 360.

At operation 310, the determination module 210 determines trending queries. The trending queries are queries that are each indicated by the query log as being received at least a threshold number of instances. Moreover, the trending queries are received at a network publication system (e.g., publication system 142), and are performed by users of the network publication system. As an example, a trending query for "Mother's Day Gifts" may be identified as having a sufficient number of occurrences over the network publication system. In further instances, the trending queries are also determined as being received within a predetermined window of time. For example, the trending query for "Mother's Day Gifts" is also identified as being submitted within the past week. As another example, a trending query for "iPhone smartphones" may be identified as having a sufficient number of occurrences. By identifying the trending queries, At operation 320, the identification module 220 identifies item pages that correspond to the trending queries. An item page includes a description of an item and an image of the item. The description of the item may provide information about the item including a price of the item. The item page also includes an option to purchase the item. In some instances, the item pages that correspond to the trending queries are item pages that are retrieved by the trending queries. For instance one of the trending queries may retrieve one of the item pages. In further instances, the item pages that correspond to the trending queries are item pages selected by users of the network publication system from results pages retrieved by the trending queries. In further instances, the item pages that correspond to the trending queries are item pages viewed by users of the network publication system as a result of the trending queries. In further instances, a trending query will include keywords that are used to identify an item page corresponding to the trending query.

At operation 330, the identification module 220 identifies aspects from the item pages that correspond to the trending queries. The aspects identify features of an item from an item page. For example, an aspect of the item may include model of the item, color of the item, size of the item, and the like. Also, each of these aspects from the items pages may be stored as data within the database.

At operation 340, the generation module 230 generates query nodes for each of the trending queries. A node may represent a trending query and include information regarding the trending query. For example, a node may include information about the trending query.

At operation 350, the generation module 230 generates leaf nodes for each of the aspects from the item pages. A leaf node may represent an aspect from an item page and include information regarding the aspect.

At operation 360, the generation module 230 generates connections between the leaf nodes and the query nodes. In further embodiments, each of the leaf nodes may also be connected to each other, and the connections are generated by the generation module 230. For example, a category leaf node that represents a category of items may also have other leaf nodes connected to the category leaf node. The leaf nodes connected to the category leaf node may represent features of items that fall within the category represented by the category leaf node.

Figure 4:
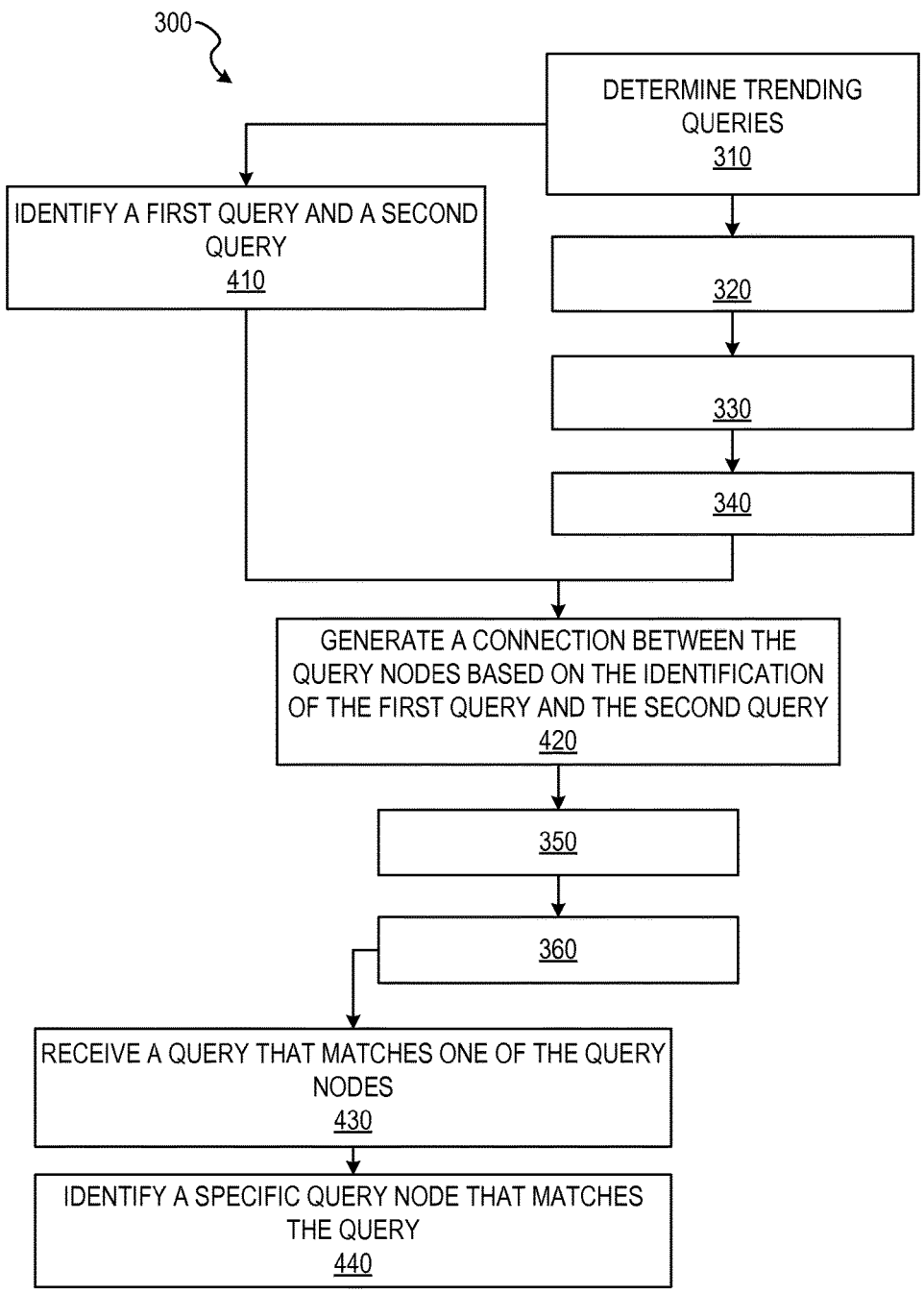

As shown in FIG. 4, the method 300 includes operations 410, 420, 430, and 440.

At operation 410, the identification module 220 identifies a first query and a second query. The identification module 220 identifies the first query and the second query from among the trending queries. Also, the first query and the second query are indicated in the query logs as being received in succession at least a threshold number of instances.

At operation 420, the generation module 230 generates a connection between the query nodes based on the identification of the first query and the second query.

At operation 430, the reception module 240 receives a query that matches one of the query nodes. The query may be received from a client device operated by a user of the network publication system.

At operation 440, the identification module 220 identifies a specific query node that matches the received query. The specific query node represents a trending query. Also, a match may comprise an overlap of a threshold number of characters between the query received at operation 430 and the trending query.

Figure 5:
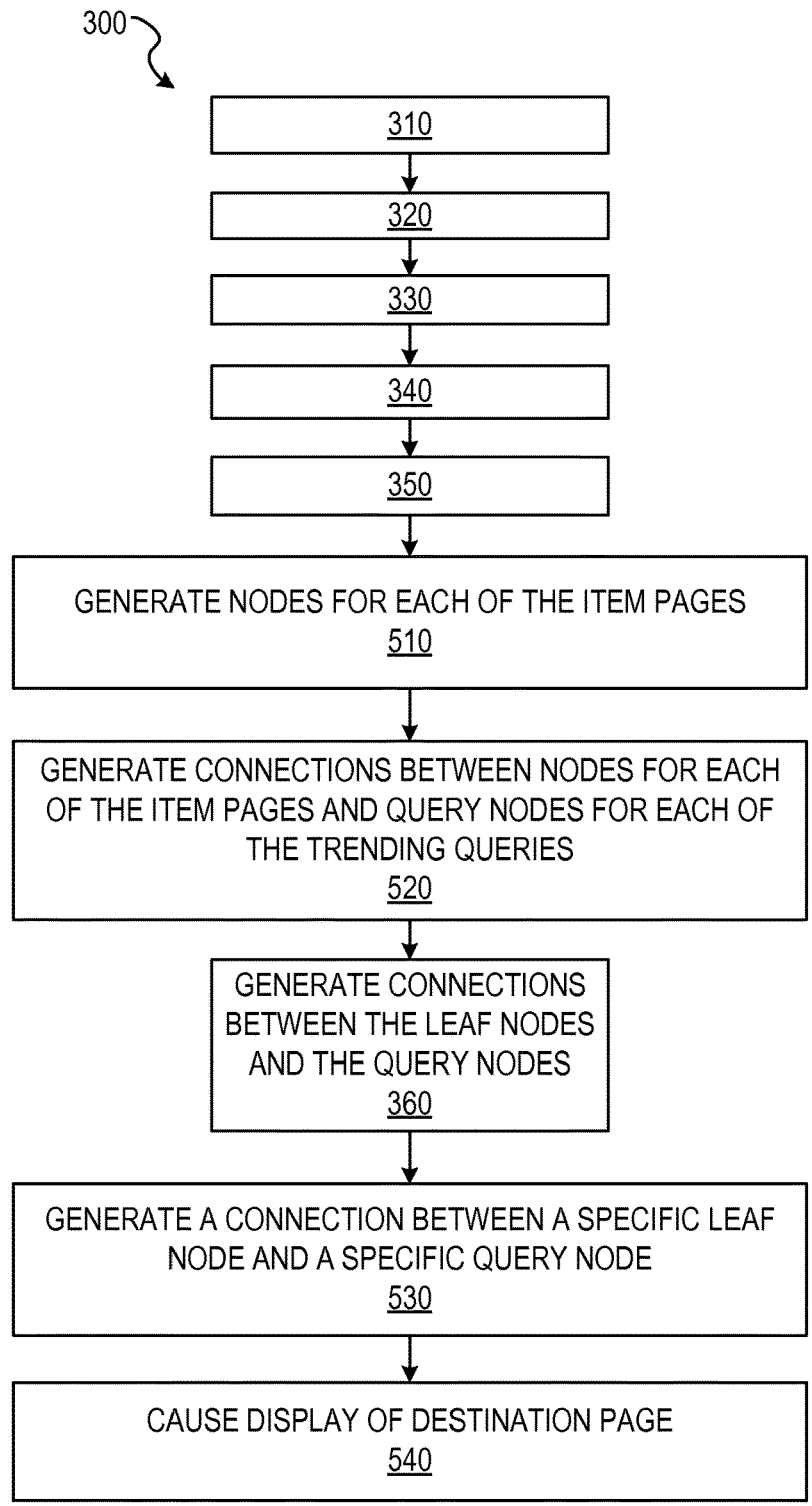
Figure 6:
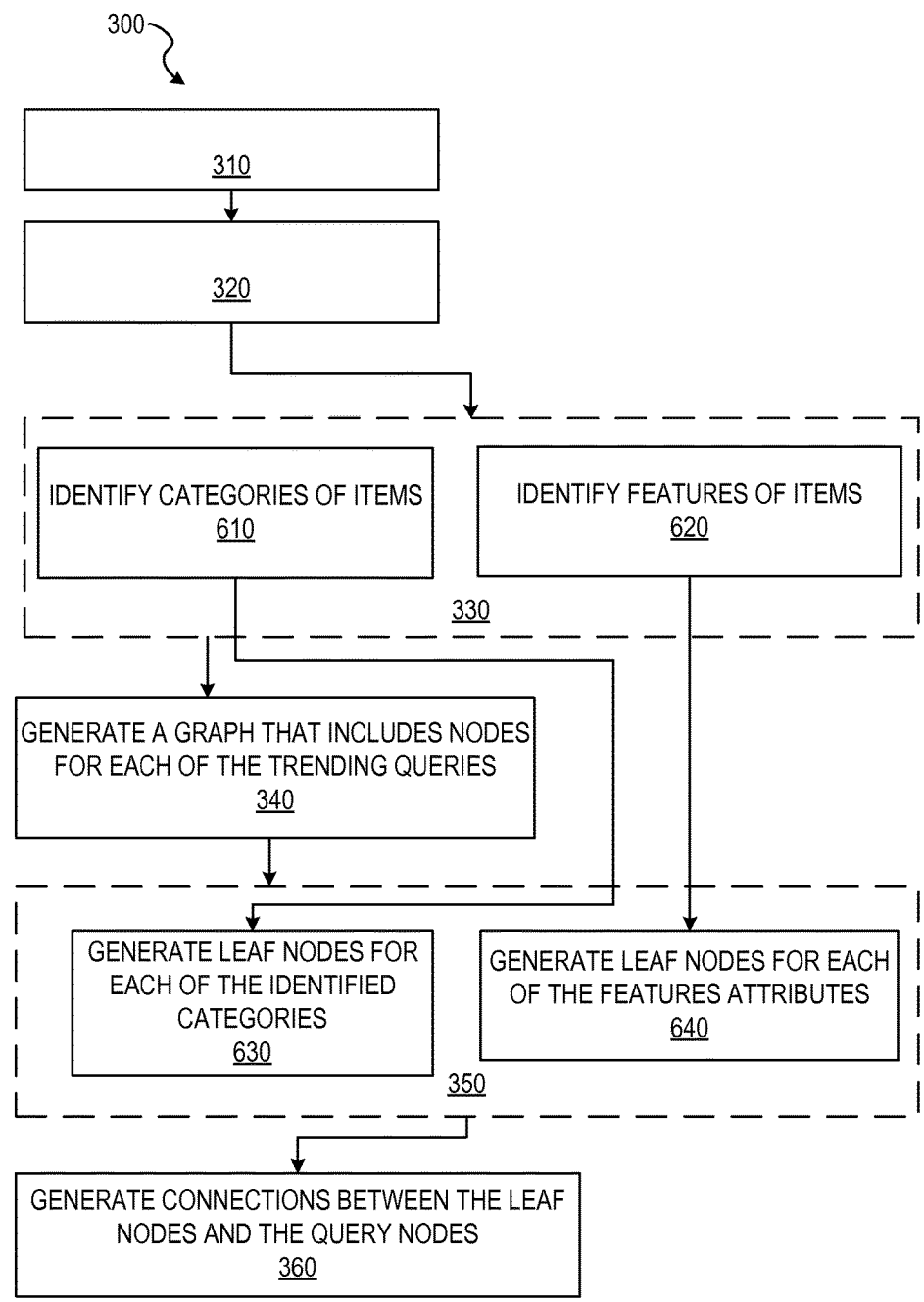

As shown in FIG. 5, the method 300 includes operations 510, 520, 530, and 540.

At operation 510, the generation module 230 generates nodes for each of the item pages. Each of the generated nodes may represent a specific item page from the item pages. Also, each of the generated nodes may include information regarding the specific item page, such as the item from the item page.

At operation 520, the generation module 230 generates connections between the nodes for each of the item pages and query nodes for each of the trending queries.

At operation 530, the generation module 230 generates a connection between a specific leaf node and a specific query node. The specific leaf node represents an aspect of an item page, and the item page corresponds to a specific query represented by the specific query node.

At operation 540, the display module 250 causes display of a destination page that includes various aspects.

At operation 610, the identification module 220 identifies categories of items. The categories of items may correspond to the items from the item pages, and the item pages correspond to the trending queries.

At operation 620, the identification module 220 identifies features of items from the item pages. The features of the items may include a brand name, a model, physical specifications, color, and the like.

At operation 630, the generation module 230 generates leaf nodes for each of the identified categories of items. Each of the generated leaf nodes may represent a specific category and also include information about the specific category.

At operation 640, the generation module 230 generates leaf nodes for each of the identified features. Each of the generated leaf nodes may represent a specific feature, and may also include information about the specific feature.

Figure 7:
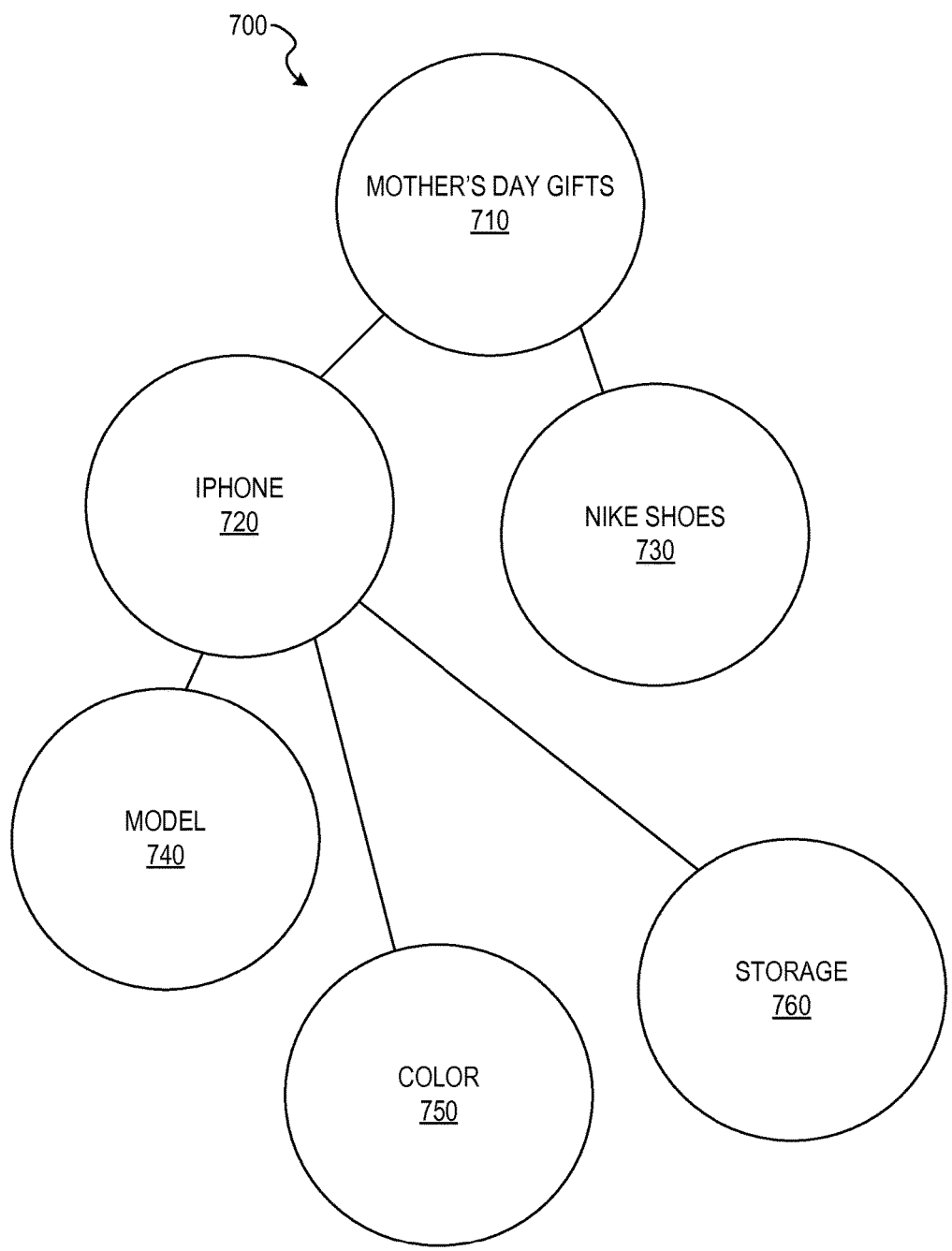
FIG. 7 is a block diagram illustrating a graph that is generated by the concept generation system, according to some example embodiments.

FIG. 7 is a block diagram illustrating a graph 700 that is generated by the concept generation system 150, according to some example embodiments. The graph 700 includes a trending query node 710, a first item node 720, a second item node 730, a first aspect node 740, a second aspect node 750, and a third aspect node 760. The trending query node 710 includes information regarding a trending query that was determined by the determination module 210. For instance, the trending query node 710 includes information on a trending query for "Mother's Day Gifts." The first item node 720 and the second item node 730 each represent items from item pages that correspond to the trending query. For example, the first item node 720 represents an iPhone®, and the second item node 730 represents Nike® shoes. Each of the item nodes include information about an item from an item page. Also, the first aspect node 740, the second aspect node 750, and the third aspect node 760 each include information regarding an aspect of an item page (e.g., iPhone®) that corresponds to the trending query of the trending query node 710.

Figure 8:
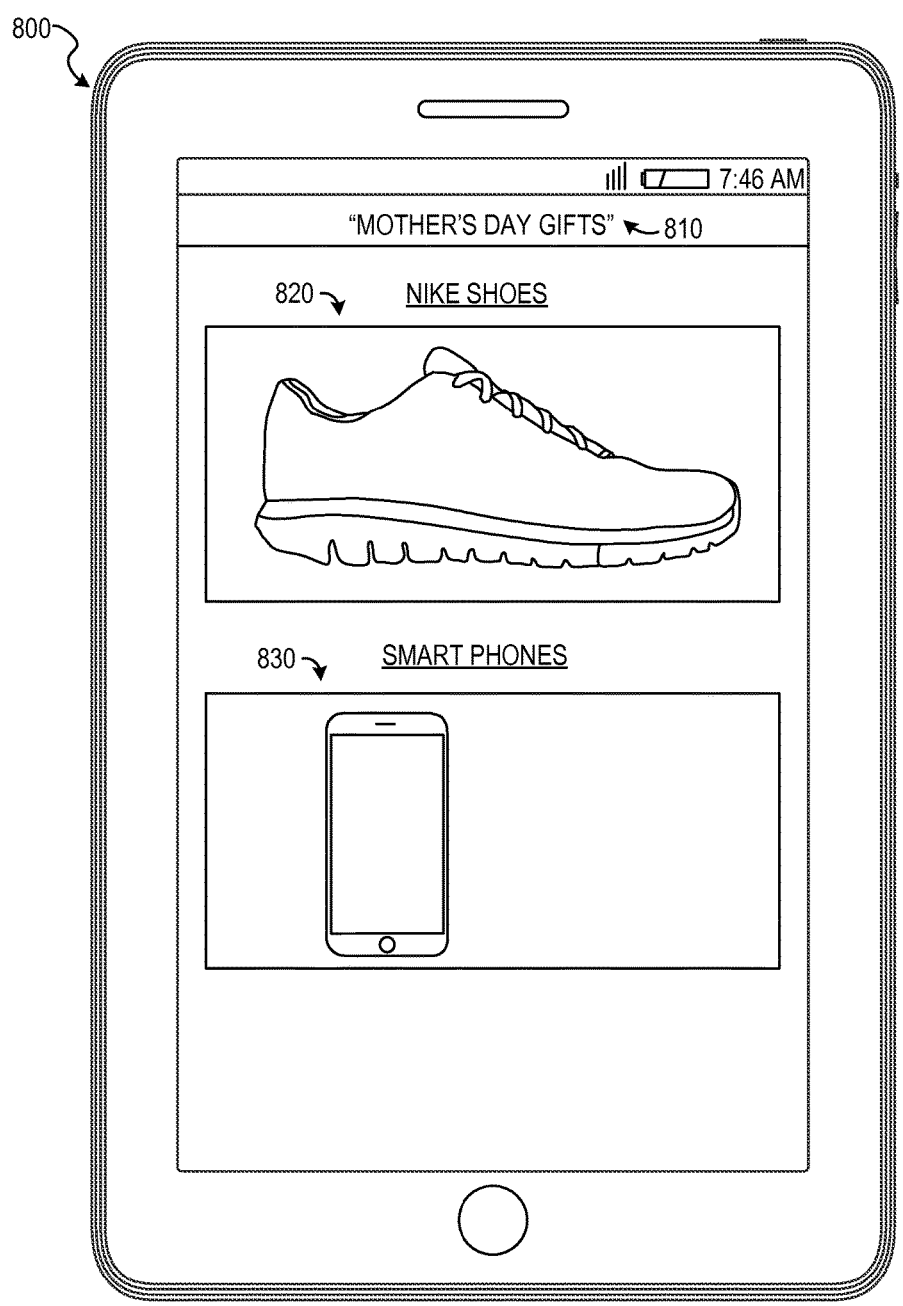
FIG. 8 is a block diagram illustrating an example user interface of a destination page, according to some example embodiments.

FIG. 8 is a block diagram illustrating an example user interface of a destination page 800, according to some example embodiments. The destination page 800 may be displayed on a client device. As shown in FIG. 8, the destination page 800 includes a title 810. In some instances, the title 810 corresponds to one of the trending queries (e.g., "Mother's Day Gifts"). The destination page 800 also includes a first link 820 and a second link 830. As shown, the first link 820 corresponds to item pages for Nike Shoes and the second link 830 corresponds to item pages for Smart Phones. Both Nike Shoes and Smart Phones may be item pages that are identified by the identification module 220. Also, the title 810 may correspond to the trending query node 710 of FIG. 7. Also, Nike Shoes may correspond to the second item node 730 of FIG. 7 and Smart Phones may correspond to the first item node 720 of FIG. 7.

Figure 9:
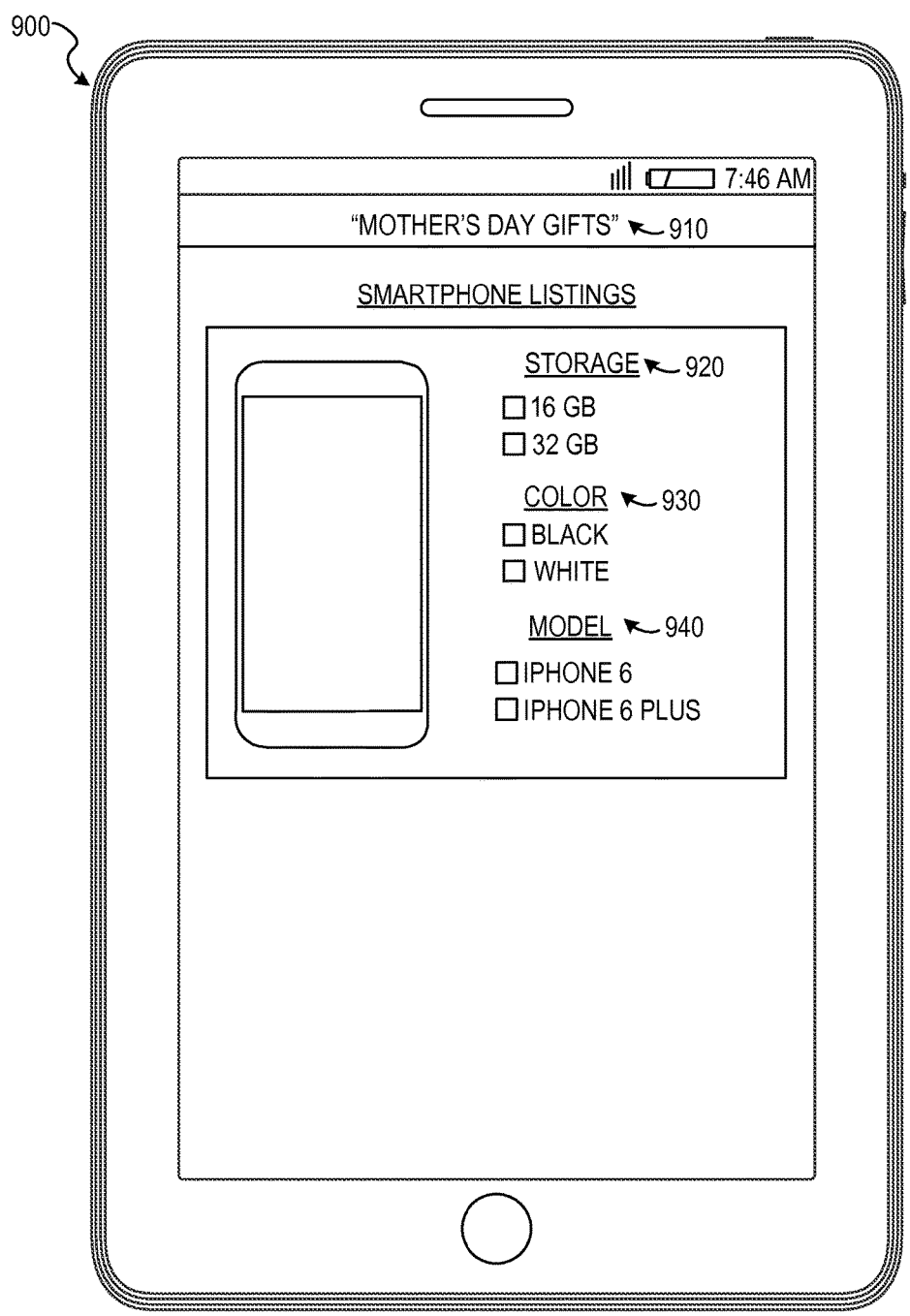
FIG. 9 is a block diagram illustrating an example user interface of a further destination page, according to some example embodiments.

FIG. 9 is a block diagram illustrating an example user interface of a further destination page 900, according to some example embodiments. The further destination page 900 may be displayed on a client device upon activation of the second link 830 of FIG. 8. The further destination page 900 may also include a title 910 that corresponds to a trending query (e.g., "Mother's Day Gifts"). Also, the further destination page 900 includes a first aspect 920, a second 930, and a third aspect 940. Each of the aspects may correspond to an item feature of an item page, and the item page may correspond to a trending query (e.g., "Mother's Day Gifts"). For example, a 16 GB black smartphone item page may correspond to the trending query for "Mother's Day Gifts." Also, a 32 GB white smartphone item page may correspond to the trending query for "Mother's Day Gifts." Each of the aspects from the further destination page 900 are selectable to cause display of a respective item page on the client device.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 10:
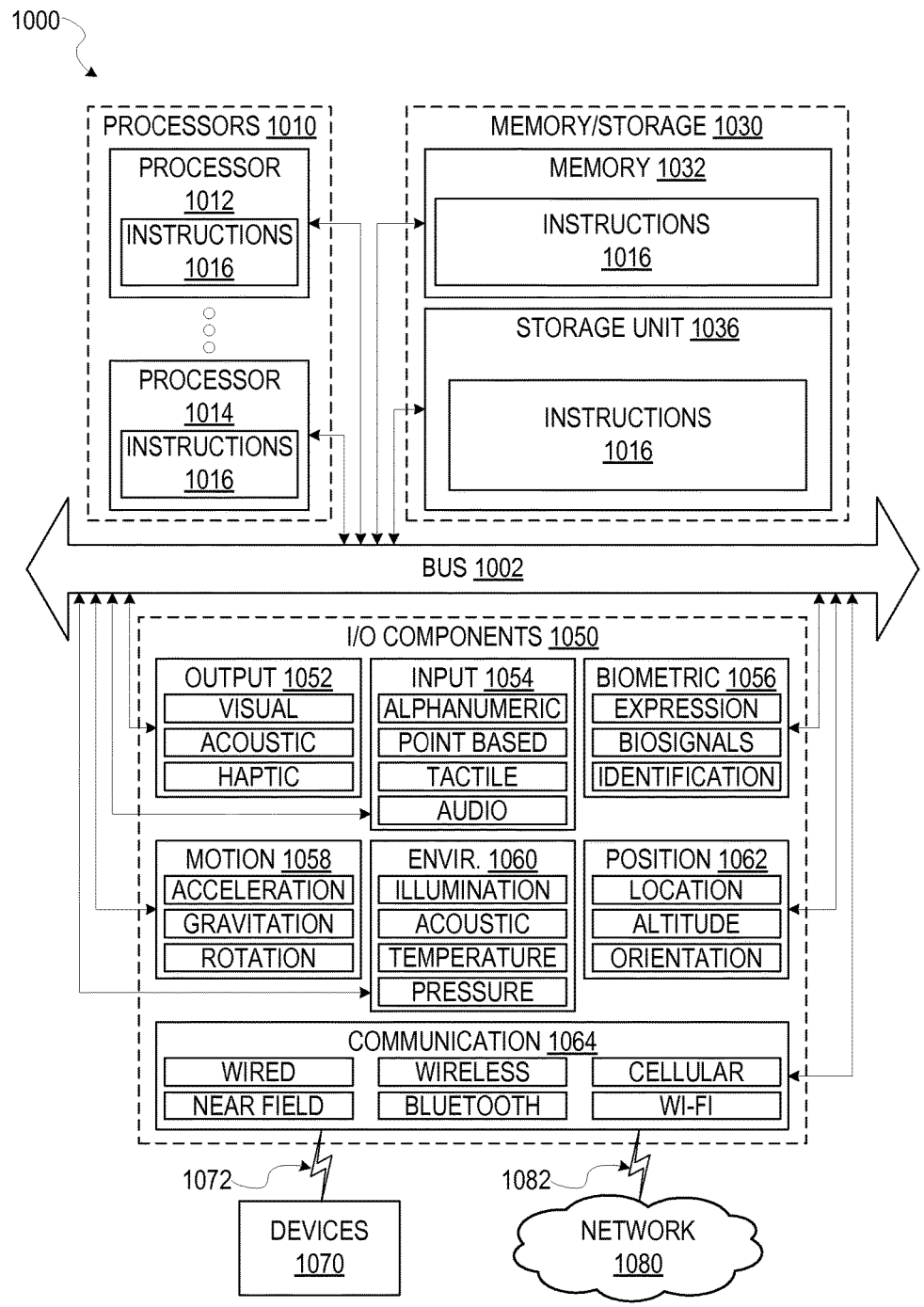
FIG. 10 illustrates a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example the instructions may cause the machine to execute the flow diagrams of FIGS. 3-6. The instructions transform the general, non-programmed machine into a particular machine specially configured to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), other smart devices, a network router, a network switch, a network bridge, or any machine capable of executing the instructions 1016, sequentially or otherwise, that specify actions to be taken by machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1012 and processor 1014 that may execute instructions 1016. The term "processor" is intended to include multi-core processor that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core process), multiple processors with a single core, multiple processors with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of processors 1010 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062 among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via coupling 1082 and coupling 1072 respectively. For example, the communication components 1064 may include a network interface component or other suitable device to interface with the network 1080. In further examples, communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or other type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to devices 1070. The term "transmission medium" shall be taken to include any intangible medium that is capable of storing, encoding, or carrying instructions 1016 for execution by the machine 1000, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
    hardware processing circuitry;
    a hardware memory storing instructions that configure the hardware processing circuitry to perform operations, the operations comprising:
    determining, from a query log stored in a database, trending queries that are each indicated as being received at least a threshold number of instances, the trending queries being performed by users of a network publication system;
    identifying item pages that correspond to the trending queries, each of the item pages having a corresponding item; and
    identifying aspects of the items corresponding to the identified item pages, the aspects being stored as data within the database, each aspect identifying a feature of its corresponding item; and
    generating a graph to include query nodes for each of the trending queries
    generating a leaf node in the graph for each of the aspects from the item pages;
    generating connections between the leaf nodes and the query nodes for each of the trending queries;
    generating a destination page indicating at least one of the identified aspects based on the generated graph; and
    cause display of the destination page on a client device.

2. The system of claim 1, the operations further comprising identifying item pages that are selected by the users of the publication system from results generated by the trending queries.

3. The system of claim 1, the operations further comprising generating a connection between a specific leaf node and a specific query node, the specific leaf node representing an aspect of an item page, the item page corresponding to a specific query being represented by the specific query node.

4. The system of claim 1,
the operations further comprising: identifying categories that correspond to items from the item pages; and
generating leaf nodes for each of the identified categories that correspond to the items from the item pages.

5. The system of claim 1,
the operations further comprising: identifying features of the items from the item pages; and
generating leaf nodes for each of the identified features of the items from the item pages.

6. The system of claim 1, the operations further comprising: identifying,
from the trending queries, a first query and a second query, wherein the first query and the second query are indicated as being received in succession at least a threshold number of instances; and
generating a connection between the query nodes for each of the trending queries based on the identification of the first query and the second query.

7. The system of claim 1, the operations further comprising:
generating nodes for each of the item pages that correspond to the trending queries; and
generating connections between the nodes for each of the item pages and the query nodes for each of the trending queries.

8. The system of claim 1, the operations further comprising: from a client device, a query that matches one of the query nodes from the generated graph; and wherein:
using the generated graph, identifying a specific query node that matches the query received from the client device.

9. The system of claim 8, wherein the destination page corresponds to the specific query node from the generated graph, and the various aspects corresponding to leaf nodes that are connected to the specific query node from the generated graph, wherein the destination page includes links that are selectable to display item pages that correspond to a trending query represented by the specific query node.

10. The system of claim 8, the operations further comprising: receiving the trending queries from devices operated by the users of the publication system.

11. A method comprising:
determining, from a query log stored in a database, trending queries that are each indicated as being received at least a threshold number of instances, the trending queries being performed by users of a network publication system;
identifying item pages that correspond to the trending queries, each of the item pages having a corresponding item;
identifying aspects of the items corresponding to the identified item pages, the aspects being stored as data within the database, each aspect identifying a feature of its corresponding item;
generating, using one or more processors, a graph to include query nodes for each of the trending queries;
generating a leaf node in the graph for each of the aspects from the item pages;
generating connections between the leaf nodes and the query nodes for each of the trending queries;
generating a destination page indicating at least one of the identified aspects based on the generated graph; and
cause display of the destination page on a client device.

12. The method of claim 11, wherein the identifying the item pages that correspond to the trending queries includes:
identifying item pages that are selected by the users of the publication system from results generated by the trending queries.

13. The method of claim 11, wherein the generating the connections between the leaf nodes and the query nodes for each of the trending queries includes:
generating a connection between a specific leaf node and a specific query node, the specific leaf node representing an aspect of an item page, the item page corresponding to a specific query being represented by the specific query node.

14. The method of claim 11, wherein:
identifying the aspects includes identifying categories that correspond to items from the item pages; and
generating leaf nodes for each of the identified categories that correspond to the items from the item pages.

15. The method of claim 11, wherein:
identifying the aspects includes identifying features of the items from the item pages; and
generating the leaf nodes includes generating leaf nodes for each of the identified features of the items from the item pages.

16. The method of claim 11, further comprising:
identifying, from the trending queries, a first query and a second query, wherein the first query and the second query are indicated as being received in succession at least a threshold number of instances; and
generating a connection between the query nodes for each of the trending queries based on the identification of the first query and the second query.

17. The method of claim 11, further comprising:
generating nodes in the graph for each of the item pages that correspond to the trending queries; and
generating connections between the nodes for each of the item pages and the query nodes for each of the trending queries.

18. The method of claim 11, further comprising:
receiving, from the client device, a query that matches one of the query nodes from the generated graph;
using the generated graph, identifying a specific query node that matches the query received from the client device, and
wherein the destination page corresponds to the specific query node from the generated graph, and the various aspects corresponding to leaf nodes that are connected to the specific query node from the generated graph.

19. The method of claim 18, wherein the destination page includes links that are selectable to display item pages that correspond to a trending query represented by the specific query node.

20. A non-transitory machine-readable medium storing instructions that, when executed by one or more processors of a machine, cause the machine to perform operations comprising:
determining, from a query log stored in a database, trending queries that are each indicated as being received at least a threshold number of instances, the trending queries being performed by users of a network publication system;

identifying item pages that correspond to the trending queries, each of the item pages having a corresponding item;

identifying aspects of the items corresponding to the identified item pages, the aspects being stored as data within the database, each aspect identifying a feature of its corresponding item;

generating a graph to include query nodes for each of the trending queries;

generating a leaf node in the graph for each of the aspects from the item pages;

generating connections between the leaf nodes and the query nodes for each of the trending queries;

generating a destination page indicating at least one of the identified aspects based on the generated graph; and cause display of the destination page on a client device.

* * * * *